(12) United States Patent
Okada et al.

(10) Patent No.: US 10,514,643 B2
(45) Date of Patent: Dec. 24, 2019

(54) SYSTEM AND METHOD FOR REPRODUCING GUIDANCE, AND NON-TRANSITORY RECORDING MEDIUM STORING COMPUTER READABLE PROGRAM

(71) Applicant: Konica Minolta, Inc., Tokyo (JP)

(72) Inventors: Tatsunori Okada, Toyokawa (JP);
Kenichi Komaba, Toyokawa (JP);
Akito Ota, Toyokawa (JP); Hiroshi Sugiura, Toyokawa (JP); Hiroaki Sugimoto, Nagoya (JP); Atsushi Tomita, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 75 days.

(21) Appl. No.: 15/811,121

(22) Filed: Nov. 13, 2017

(65) Prior Publication Data

US 2018/0136597 A1 May 17, 2018

(30) Foreign Application Priority Data

Nov. 14, 2016 (JP) ................. 2016-221802

(51) Int. Cl.
*G03G 15/00* (2006.01)
*G06F 3/0488* (2013.01)
*H04N 1/04* (2006.01)

(52) U.S. Cl.
CPC .......... *G03G 15/502* (2013.01); *G03G 15/55* (2013.01); *G06F 3/0488* (2013.01); *H04N 1/04* (2013.01)

(58) Field of Classification Search
CPC ..... G03G 15/55; G03G 15/502; G06F 3/0488
See application file for complete search history.

(56) References Cited

U.S. PATENT DOCUMENTS

2005/0271410 A1* 12/2005 Namizuka ................. G06F 1/32
399/75
2008/0247768 A1* 10/2008 Yamada ................. G03G 15/70
399/21

(Continued)

FOREIGN PATENT DOCUMENTS

CN 101165624 A 4/2008
CN 101448055 A 6/2009

(Continued)

OTHER PUBLICATIONS

China Patent Application No. 201711103765.8; Office Action; dated Mar. 15, 2019; 23 pages.

(Continued)

*Primary Examiner* — Gregory H Curran
(74) *Attorney, Agent, or Firm* — Baker Hostetler

(57) ABSTRACT

A system for reproducing guidance on a task including a plurality of steps is provided. The system includes a hardware processor; and an output device configured to output an image or audio; wherein the hardware processor determines a completed step of the steps based on a change in state of a target on which the task is to be performed, the completed step being a step which has been completed, and the hardware processor causes the output device to reproduce an unfinished part in a first form where a predetermined condition is not satisfied, and causes the output device to reproduce the unfinished part in a second form different from the first form where the predetermined condition is satisfied, the unfinished part being a part corresponding to an unfinished step which is not determined to have been completed among the steps.

16 Claims, 20 Drawing Sheets

(56) References Cited

U.S. PATENT DOCUMENTS

2013/0129316 A1* 5/2013 Dontcheva .............. H04N 5/76
  386/241
2013/0163955 A1 6/2013 Yamamoto

FOREIGN PATENT DOCUMENTS

| CN | 103856663 A | 6/2014 |
| JP | 2013-135404 A | 7/2013 |

OTHER PUBLICATIONS

Chinese Official Communication dated Aug. 13, 2019 for corresponding Chinese patent application No. 201711103765.8 and its English translation.

* cited by examiner

| MAINTENANCE | CORRESPONDING ERROR | STEPS | | | | |
|---|---|---|---|---|---|---|
| | | 1 | 2 | 3 | 4 | 5 |
| CLEAR PAPER JAM IN FIXING UNIT | PAPER JAM IN FIXING UNIT | RIGHT DOOR SENSOR BEFORE: RIGHT DOOR CLOSED AFTER: RIGHT DOOR OPEN | LEVER SENSOR BEFORE: LEVER IN UP POSITION AFTER: LEVER IN DOWN POSITION | FIRST PAPER PATH SENSOR BEFORE: PAPER PRESENT AFTER: NO PAPER PRESENT | LEVER SENSOR BEFORE: LEVER IN DOWN POSITION AFTER: LEVER IN UP POSITION | RIGHT DOOR SENSOR BEFORE: RIGHT DOOR OPEN AFTER: RIGHT DOOR CLOSED |
| CLEAR JAM OF PRINTED MATTER ON PAPER PATH | JAM OF PRINTED MATTER ON PAPER PATH | RIGHT DOOR SENSOR BEFORE: RIGHT DOOR CLOSED AFTER: RIGHT DOOR OPEN | INNER DOOR SENSOR BEFORE: INNER DOOR CLOSED AFTER: INNER DOOR OPEN | SECOND PAPER PATH SENSOR BEFORE: PAPER PRESENT AFTER: NO PAPER PRESENT | INNER DOOR SENSOR BEFORE: INNER DOOR OPEN AFTER: INNER DOOR CLOSED | RIGHT DOOR SENSOR BEFORE: RIGHT DOOR OPEN AFTER: RIGHT DOOR CLOSED |
| ... | ... | ... | ... | ... | ... | ... |

6AH1 (6AH)
6AH2 (6AH)
6A1 (6A)
6A2 (6A)

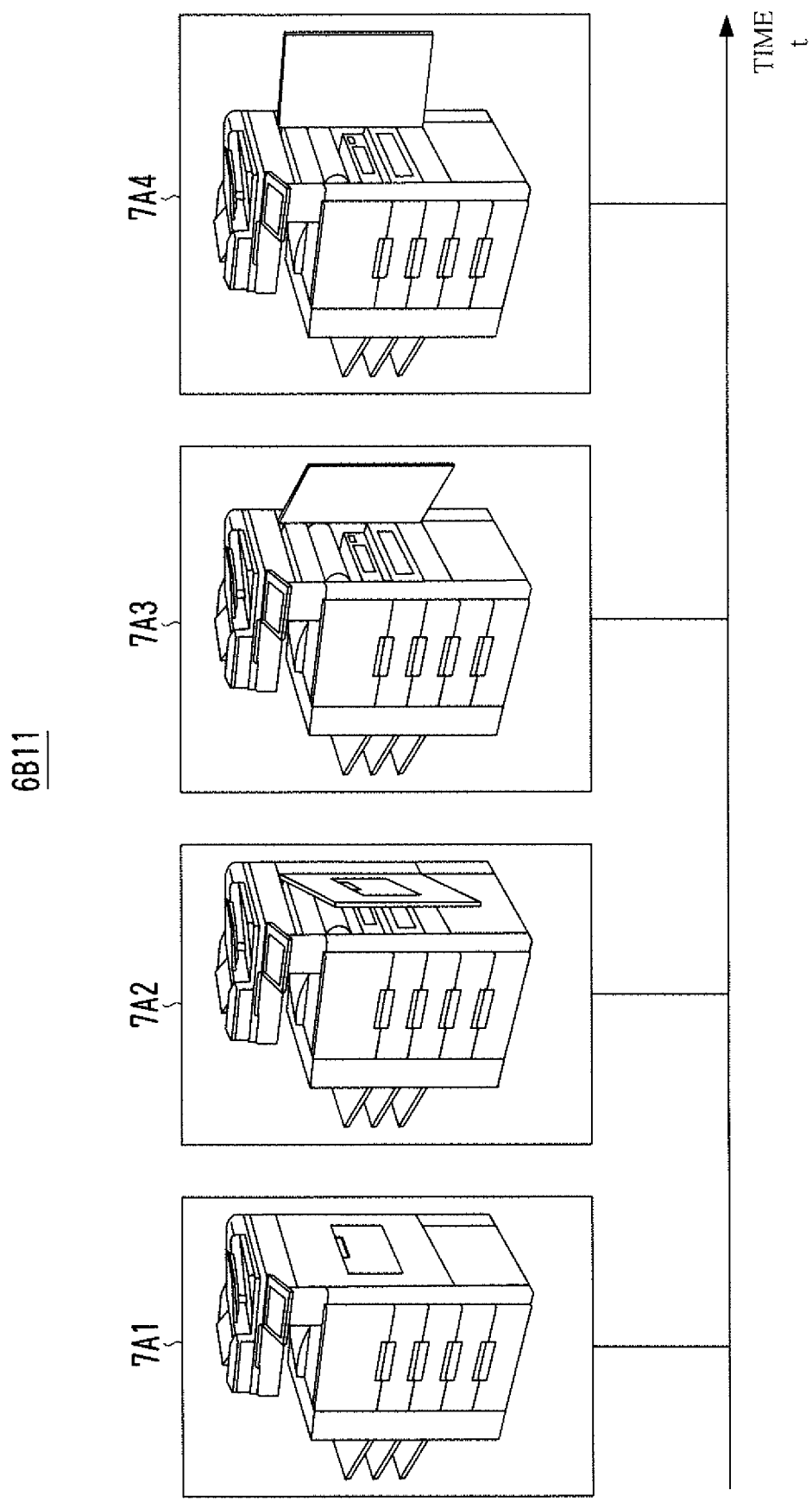

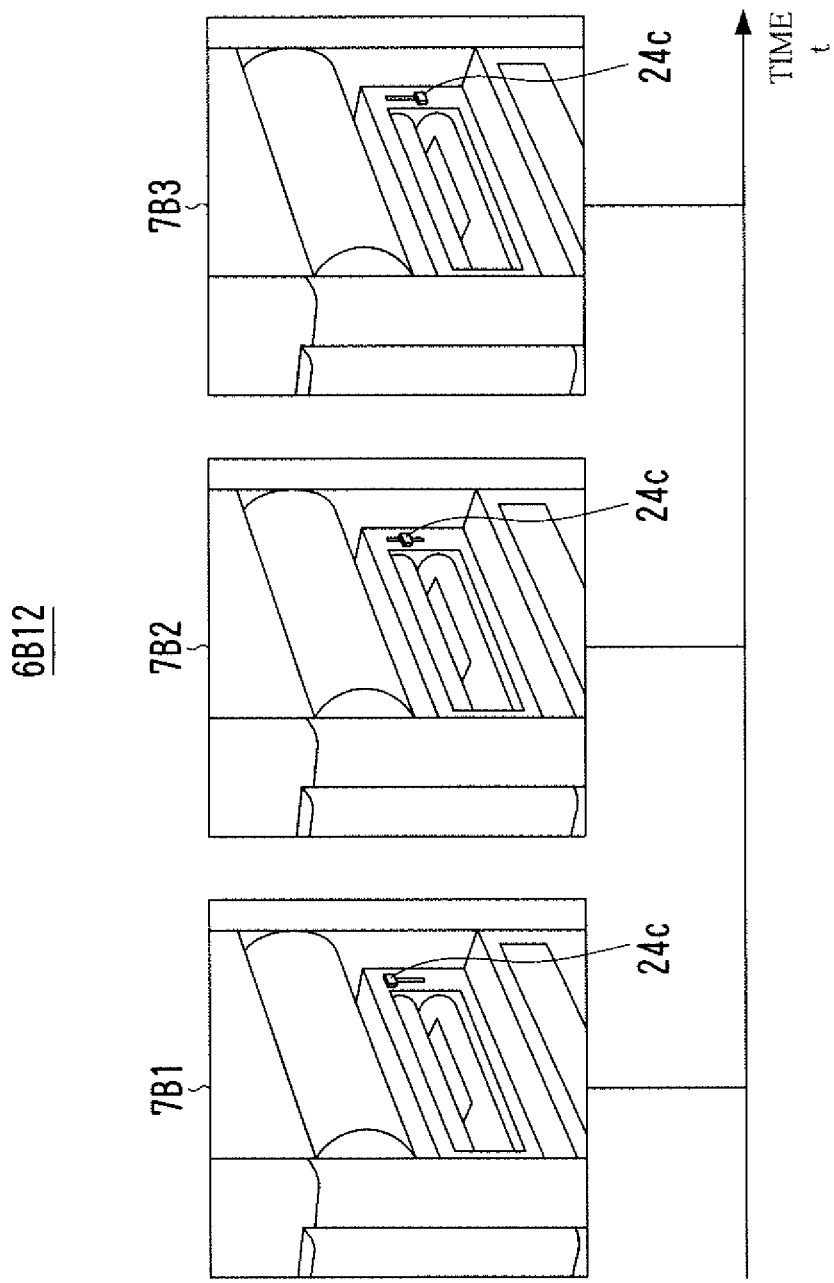

FIG. 14

CLEAR PAPER JAM IN FIXING UNIT

| USER NAME | THE NUMBER OF FAILURES Cg | | | | |
|---|---|---|---|---|---|
| | STEP_1 | STEP_2 | STEP_3 | STEP_4 | STEP_5 |
| USER_A | 0 | 0 | 3 | 0 | 1 — 6E1 (6E) |
| USER_B | 2 | 3 | 1 | 1 | 0 — 6E2 (6E) |
| USER_C | 0 | 1 | 0 | 0 | 0 — 6E3 (6E) |
| ... | ... | ... | ... | ... | ... |

FIG. 15

| ATTRIBUTES | STEP_1 | STEP_2 | STEP_3 | STEP_4 | STEP_5 |
|---|---|---|---|---|---|
| SUBSTANTIAL INFLUENCE ON IMAGE FORMING APPARATUS | | YES | | | |
| DIFFICULT OPERATION | | YES | | | |
| RISK PARAMETER | | | FIXING UNIT TEMPERATURE≥80°C | | |

6F

SYSTEM AND METHOD FOR REPRODUCING GUIDANCE, AND NON-TRANSITORY RECORDING MEDIUM STORING COMPUTER READABLE PROGRAM

Japanese Patent application No. 2016-221802 filed on Nov. 14, 2016, including description, claims, drawings, and abstract of the entire disclosure is incorporated herein by reference in its entirety.

BACKGROUND

1. Technological Field

The present invention relates to a technology for reproducing maintenance guidance and so on.

2. Description of the Related Art

Recent years have seen the widespread use of image forming apparatuses into which functions such as copying, network printing, faxing, scanning, and file server are integrated. Such an image forming apparatus is called a "multifunction device" or a "Multi-Functional Peripheral (MFP)". Due to the different functions integrated, the image forming apparatus is complex in structure. This requires a user to perform a complicated task to deal with an error or a complicated task for maintenance.

For the purpose of offering guidance on how to deal with such a complicated task to a user for easy understanding, the following image processing apparatus has been proposed, for example.

The image processing apparatus is capable of reproducing a video. The image processing apparatus includes a moving means for moving the reproduction position of a video to an arbitrary position according to the user operation, and determines whether the reproduction position after movement is a position rewound from the reproduction position before movement. If a determination is made that the reproduction position after movement is a position rewound from the reproduction position before movement, the image processing apparatus is provided with an operation means for designating control of loop reproduction of a section from the start position to the end position by saving the reproduction position after movement as the start position of a section subjected to loop reproduction, and saving the reproduction position before movement as the end position of a section subjected to loop reproduction (English abstract of Japanese Laid-open Patent Publication No. 2013-135404).

In the meantime, the guidance is viewed, in some cases, by an experienced user who is used to operating an image forming apparatus, and viewed, in other cases, by an inexperienced user who is not used to the operation. Such an experienced user may perform certain maintenance for the first time. Such an unexperienced user may be used to certain maintenance because he/she has ever performed the maintenance a few times.

As seen from the above, the guidance is viewed under different conditions. In order to provide a user with appropriate guidance, it is probably possible to prepare some editions of the guidance suitable for the individual conditions. This, however, places a burden on a manufacturer of the image forming apparatus. Further, it is difficult for the user to select guidance suitable for him/her.

SUMMARY

The present invention has been achieved in light of such a problem, and therefore, an object of an embodiment of the present invention is to provide guidance suitable for a user more easily than is conventionally possible without preparing different editions of the guidance.

To achieve at least one of the abovementioned objects, according to an aspect of the present invention, a system reflecting one aspect of the present invention is a system for reproducing guidance on a task including a plurality of steps. The system includes a hardware processor; and an output device configured to output an image or audio; wherein the hardware processor determines a completed step of the steps based on a change in state of a target on which the task is to be performed, the completed step being a step which has been completed, and the hardware processor causes the output device to reproduce an unfinished part in a first form where a predetermined condition is not satisfied, and causes the output device to reproduce the unfinished part in a second form different from the first form where the predetermined condition is satisfied, the unfinished part being a part corresponding to an unfinished step which is not determined to have been completed among the steps.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5 is a diagram showing an example of state change data.

FIG. 6 is a diagram showing an example of images included in a moving image of a first chapter.

FIG. 7 is a diagram showing an example of images included in a moving image of a second chapter.

FIG. 14 is a diagram showing an example of number of failures data.

FIG. 15 is a diagram showing an example of special step data.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
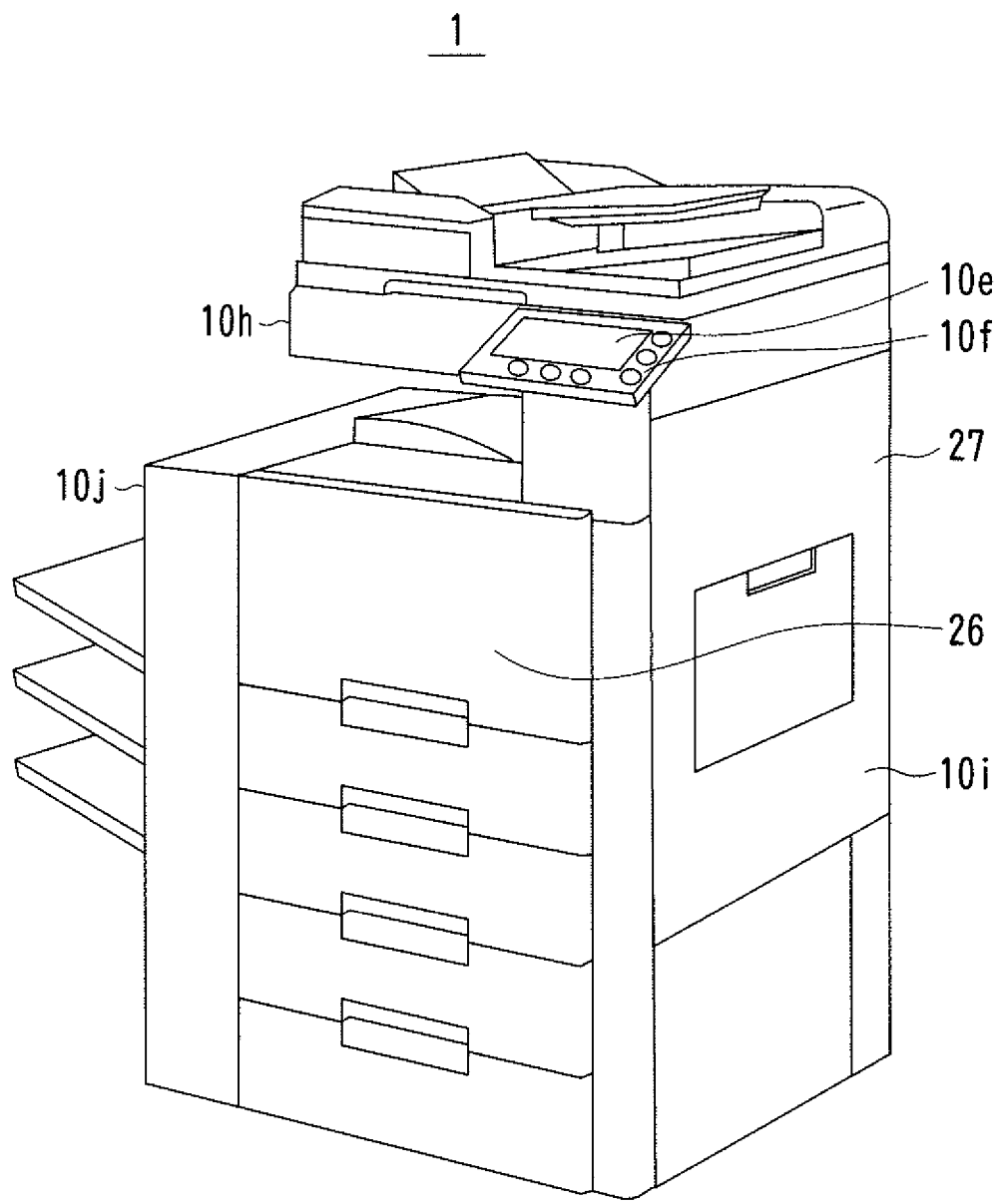
FIG. 1 is a diagram showing an example of the external view of an image forming apparatus.
Figure 2:
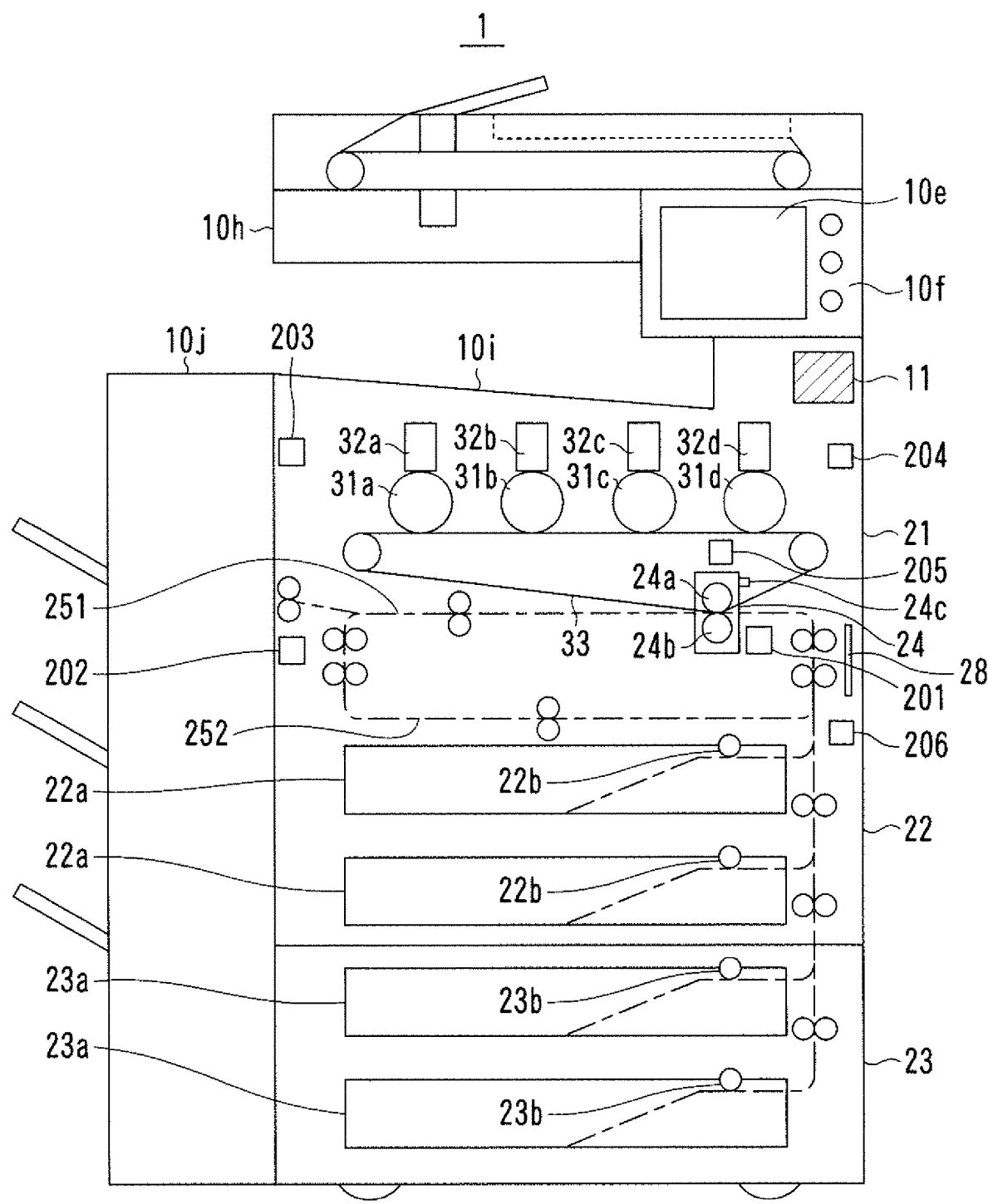
FIG. 2 is a diagram showing an example of the configuration of a printing unit of an image forming apparatus.
Figure 3:
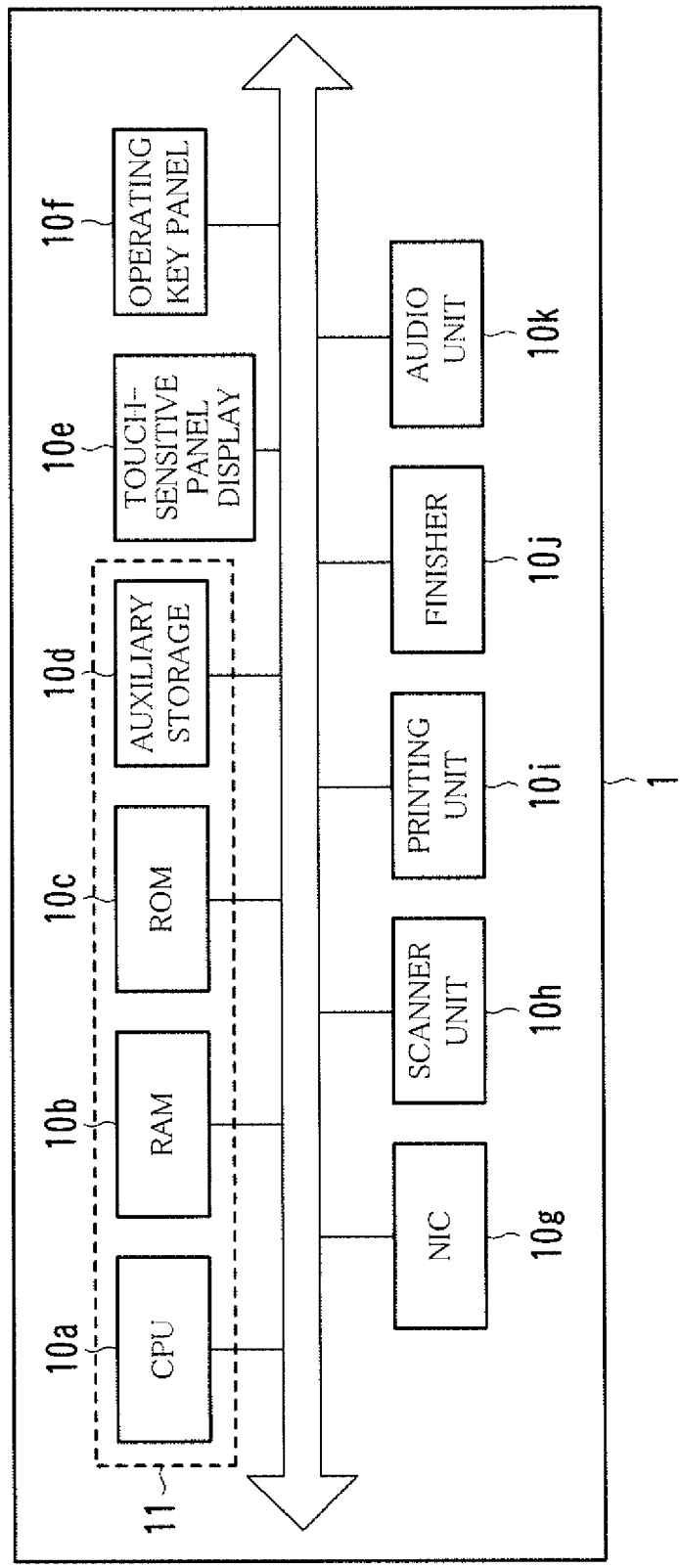
FIG. 3 is a diagram showing an example of the hardware configuration of an image forming apparatus.
Figure 4:
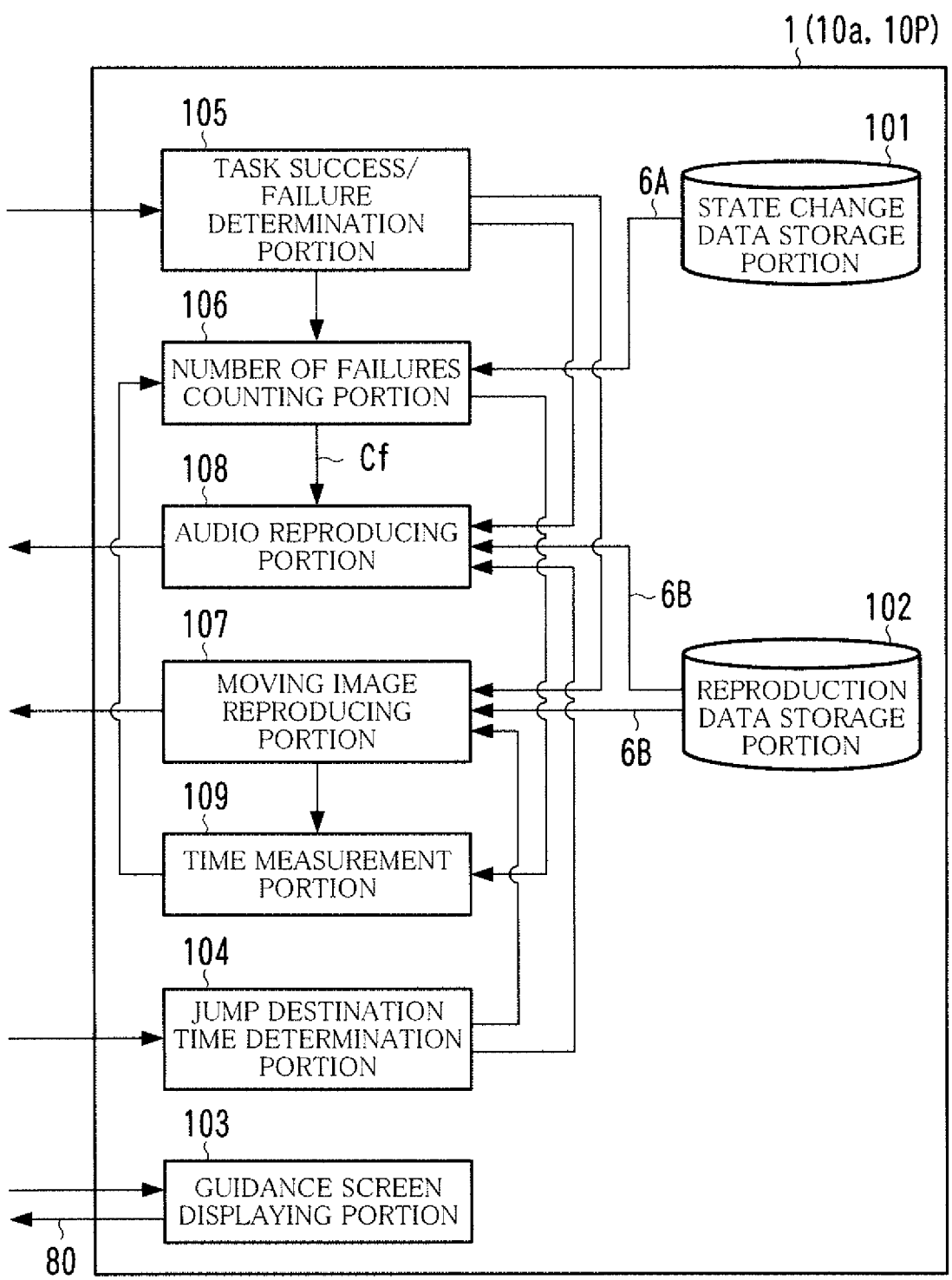
FIG. 4 is a diagram showing an example of the functional configuration of an image forming apparatus.

FIG. 1 is a diagram showing an example of the external view of an image forming apparatus 1. FIG. 2 is a diagram showing an example of the configuration of a printing unit 10i of the image forming apparatus 1. FIG. 3 is a diagram showing an example of the hardware configuration of the image forming apparatus 1. FIG. 4 is a diagram showing an example of the functional configuration of the image forming apparatus 1.

The image forming apparatus 1 shown in FIG. 1 is an apparatus into which functions such as copying, PC printing, cloud printing, faxing, scanning, and box function are incorporated. The image forming apparatus 1 is generally called a "multifunction device" or a "Multi-Functional Peripheral (MFP)". The image forming apparatus 1 is provided in a Local Area Network (LAN).

The PC printing function is to print an image onto paper based on image data received from a terminal provided in the LAN. The PC printing function is sometimes called a "network printing function" or "network printer function".

The cloud printing function is to receive image data from a terminal external to the LAN through a server on the Internet to print an image onto paper.

According to the box function, each user is given a storage area called a "box" or a "personal box". The box function enables each user to save image data and so on to his/her storage area and to manage the image data and so on therein. Such boxes may be provided on a group-by-group basis and be shared by group members. The box corresponds to a "folder" or a "directory" in a personal computer.

Before using the image forming apparatus 1, the user logs into the image forming apparatus 1 with his/her user account.

Referring to FIGS. 1-3, the image forming apparatus 1 is configured of a control unit 11, a touch-sensitive panel display 10e, an operating key panel 10f, a Network Interface Card (NIC) 10g, a scanner unit 10h, the printing unit 10i, a finisher 10j, an audio unit 10k, and so on.

The touch-sensitive panel display 10e displays, for example, a screen for presenting messages to the user, a screen for allowing the user to input commands or information, a screen for showing the results of processing executed by the control unit 11. The touch-sensitive panel display 10e also displays a moving image of guidance on how to operate the image forming apparatus 1. The touch-sensitive panel display 10e sends a signal indicating a touched location to the control unit 11.

The operating key panel 10f is a so-called hardware keyboard. The operating key panel 10f has numeric keys, a start key, a stop key, and a function key.

The NIC 10g performs communication with other device in accordance with a protocol such as Transmission Control Protocol/Internet Protocol (TCP/IP).

The scanner unit 10h optically reads an image on a sheet of paper placed on a platen glass to generate image data thereof.

The printing unit 10i includes an image formation section 21, a paper feed section 22, a paper feed cabinet 23, a fixing unit 24, a printed matter path 251, a feedback path 252, an upper front door 26, a right door 27, an inner door 28, a first paper path sensor 201, a second paper path sensor 202, an upper front door sensor 203, a right door sensor 204, a lever sensor 205, and an inner door sensor 206. The configuration enables printing, onto paper, of an image read out by the scanner unit 10h and of an image received by the NIC 10g from other terminal.

The image formation section 21 is a tandem color print engine by electrophotographic steps. The image formation section 21 is provided with photoconductive drums 31a, 31b, 31c, and 31d, exposure scanning units 32a, 32b, 32c, and 32d, a transfer belt 33, and so on.

The photoconductive drums 31a, 31b, 31c, and 31d are photoconductive drums corresponding to yellow, magenta, cyan, and black, respectively. Likewise, the exposure scanning units 32a, 32b, 32c, and 32d are exposure scanning units corresponding to yellow, magenta, cyan, and black, respectively.

The exposure scanning units 32a, 32b, 32c, and 32d perform exposure depending on a print target image based on a signal from the control unit 11 to form latent images on the photoconductive drums 31a, 31b, 31c, and 31d. Then, toner of each color is attached.

The toner images of the individual colors formed on the photoconductive drums 31a, 31b, 31c, and 31d are overlaid on the transfer belt 33. Thereby, a full-color toner image is formed on the transfer belt 33.

The paper feed section 22 is included as standard equipment in the image forming apparatus 1. The paper feed section 22 is a unit for supplying paper to the image formation section 21. The paper feed section 22 is provided with one or more paper feed cassettes 22a, pickup rollers 22b, and so on. Paper sheets are loaded into the paper feed cassettes 22a. The pickup rollers 22b pick up the paper sheets, one by one, from the paper feed cassette 22a to send out the paper sheet to the image formation section 21.

As with the paper feed section 22, the paper feed cabinet 23 is a unit for supplying paper to the image formation section 21. The paper feed cabinet 23 is mounted on the image forming apparatus 1 as optional equipment. The paper sent out, by pickup rollers 23b, from the paper feed cassette 23a of the paper feed cabinet 23 is fed through the paper feed section 22 to the image formation section 21.

The fixing unit 24 is provided with two heat rollers 24a and 24b, a lever 24c, and so on. The toner image formed on the transfer belt 33 is transferred by the heat rollers 24a and 24b to the paper sent out from the paper feed section 22 or the paper feed cabinet 23. Moving the lever 24c down separates the heat rollers 24a and 24b from each other. Moving the lever 24c up presses the heat rollers 24a and 24b onto each other.

The fixing unit 24 is also provided with a temperature sensor. The temperature sensor is operable to measure the temperatures of the heat rollers 24a and 24b and conveys the result of the measurement to the control unit 11.

The printed matter path 251 is a path for a printed matter having the toner image transferred by the fixing unit 24 to be conveyed to the finisher 10j.

The upper front door 26 is provided in the front face of the image forming apparatus 1. A job such as printing is executed with the upper front door 26 closed. Maintenance such as a task for clearing an error or adding consumables is performed with the upper front door 26 opened appropriately.

The right door 27 is provided on the observer's right of the image forming apparatus 1. The inner door 28 is to cover the printed matter path 251 and the feedback path 252. A job such as printing is executed with the right door 27 and the inner door 28 closed. The maintenance is performed with the right door 27 or the inner door 28 opened appropriately.

The first paper path sensor 201 is disposed near the fixing unit 24 to detect the presence/absence of paper at the fixing unit 24 or on the paper path near the fixing unit 24. The first paper path sensor 201 also detects a paper jam occurring in the fixing unit 24 or on the paper path near the fixing unit 24.

The second paper path sensor 202 is disposed near the printed matter path 25 to detect the presence/absence of a printed matter at this position.

The upper front door sensor 203 is disposed near the upper front door 26 to detect an open/closed state of the upper front door 26. The right door sensor 204 is disposed near the right door 27 to detect an open/closed state of the right door 27.

The lever sensor 205 detects a state of the lever 24c, specifically, detects whether the lever 24c is in the "up" position or the "down" position. The inner door sensor 206 is disposed near the inner door 28 to detect an open/closed state of the inner door 28.

The finisher 10j applies a post-process, if necessary, to the printed matter obtained by the printing unit 10i. The post-process includes stapling the printed matter, punching a hole in the printed matter, and folding the printed matter.

For double-sided printing, paper having an image printed on its one side is switched back near the finisher 10j, and then is fed again to the image formation section 21.

The audio unit 10k is configured of a soundboard, a speaker, and so on to output audio guidance.

The control unit 11 is configured of a Central Processing Unit (CPU) 10a, a Random Access Memory (RAM) 10b, a Read Only Memory (ROM) 10c, an auxiliary storage 10d, and so on.

The ROM 10c or the auxiliary storage 10d stores, therein, a program for implementing the foregoing functions such as copying function. The ROM 10c or the auxiliary storage 10d also stores, therein, a guidance reproducing program 10P (FIG. 4).

The guidance reproducing program 10P is to reproduce a moving image and audio of guidance which gives the user an explanation for maintenance how to clear an error or to add consumables.

The programs are loaded into the RAM 10b as necessary, and are executed by the CPU 10a. The auxiliary storage 10d is, for example, a hard disk drive or a Solid State Drive (SSD).

The guidance reproducing program 10P implements the functions of a state change data storage portion 101, a reproduction data storage portion 102, a guidance screen displaying portion 103, a jump destination time determination portion 104, a task success/failure determination portion 105, a number of failures counting portion 106, a moving image reproducing portion 107, an audio reproducing portion 108, a time measurement portion 109, and so on, all of which are shown in FIG. 4.

Hereinafter, the individual portions of the state change data storage portion 101 through the time measurement portion 109 are described with reference to FIGS. 5-12, and so on.

Figure 8:
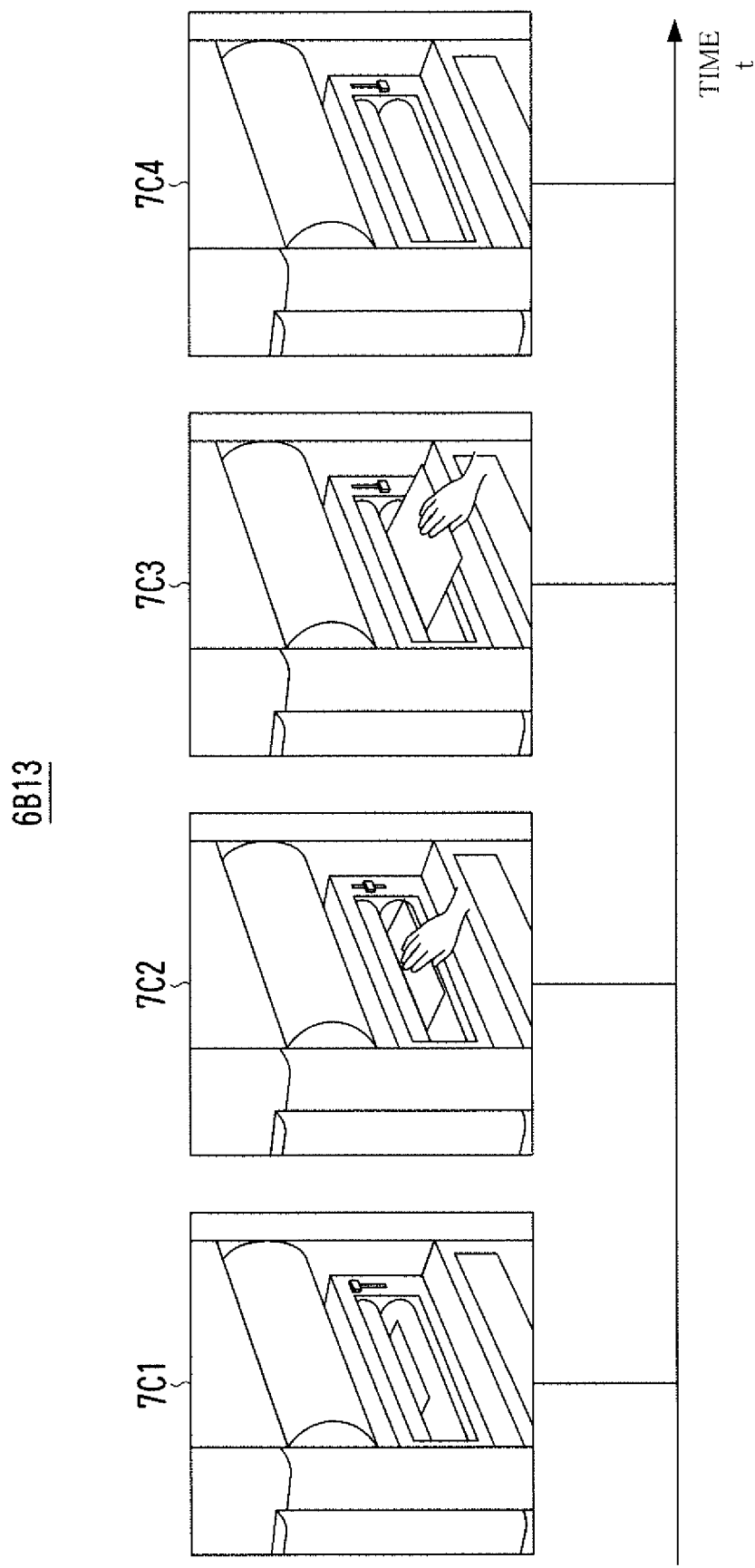
FIG. 8 is a diagram showing an example of images included in a moving image of a third chapter.
Figure 9:
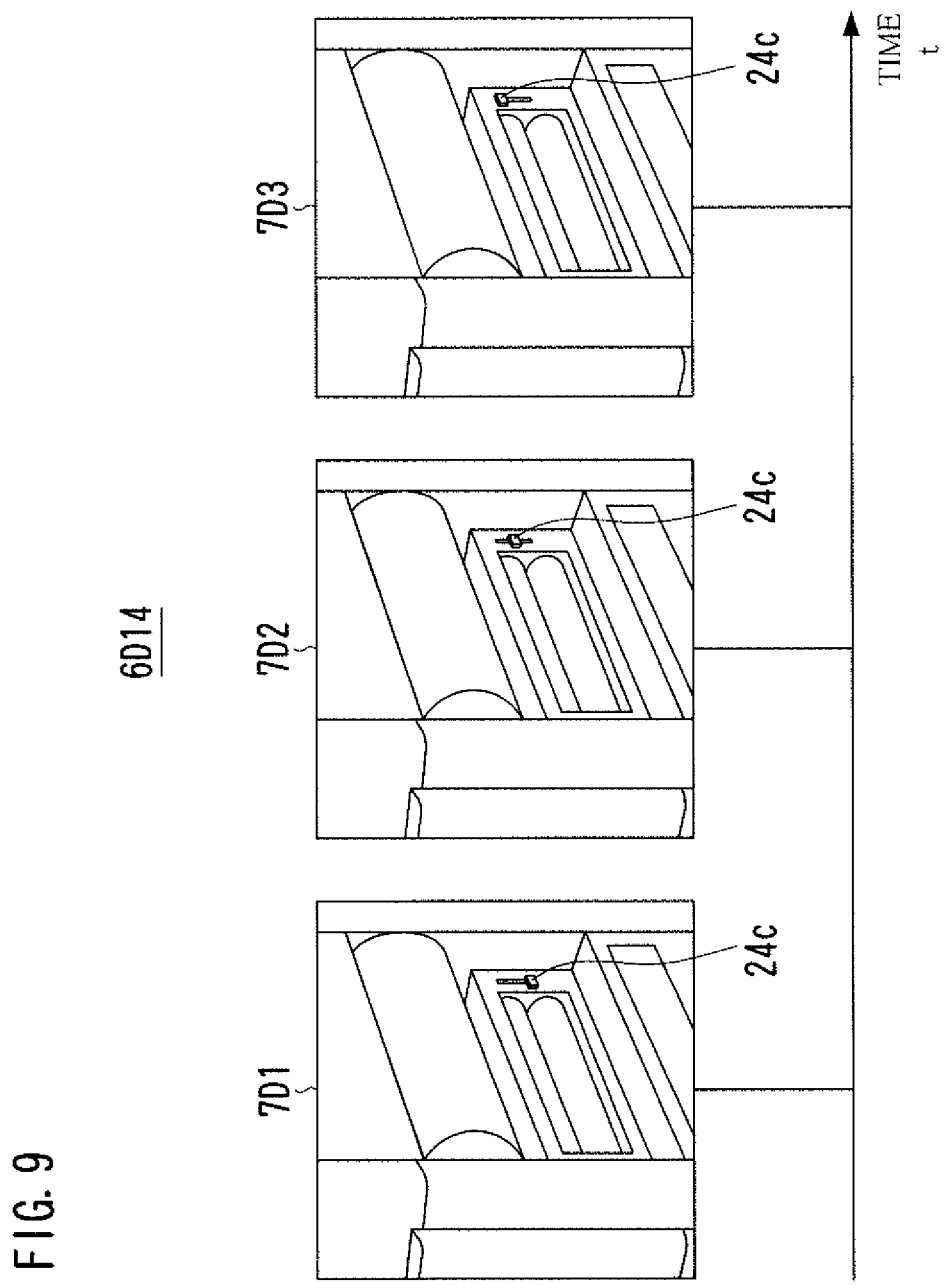
FIG. 9 is a diagram showing an example of images included in a moving image of a fourth chapter.
Figure 10:
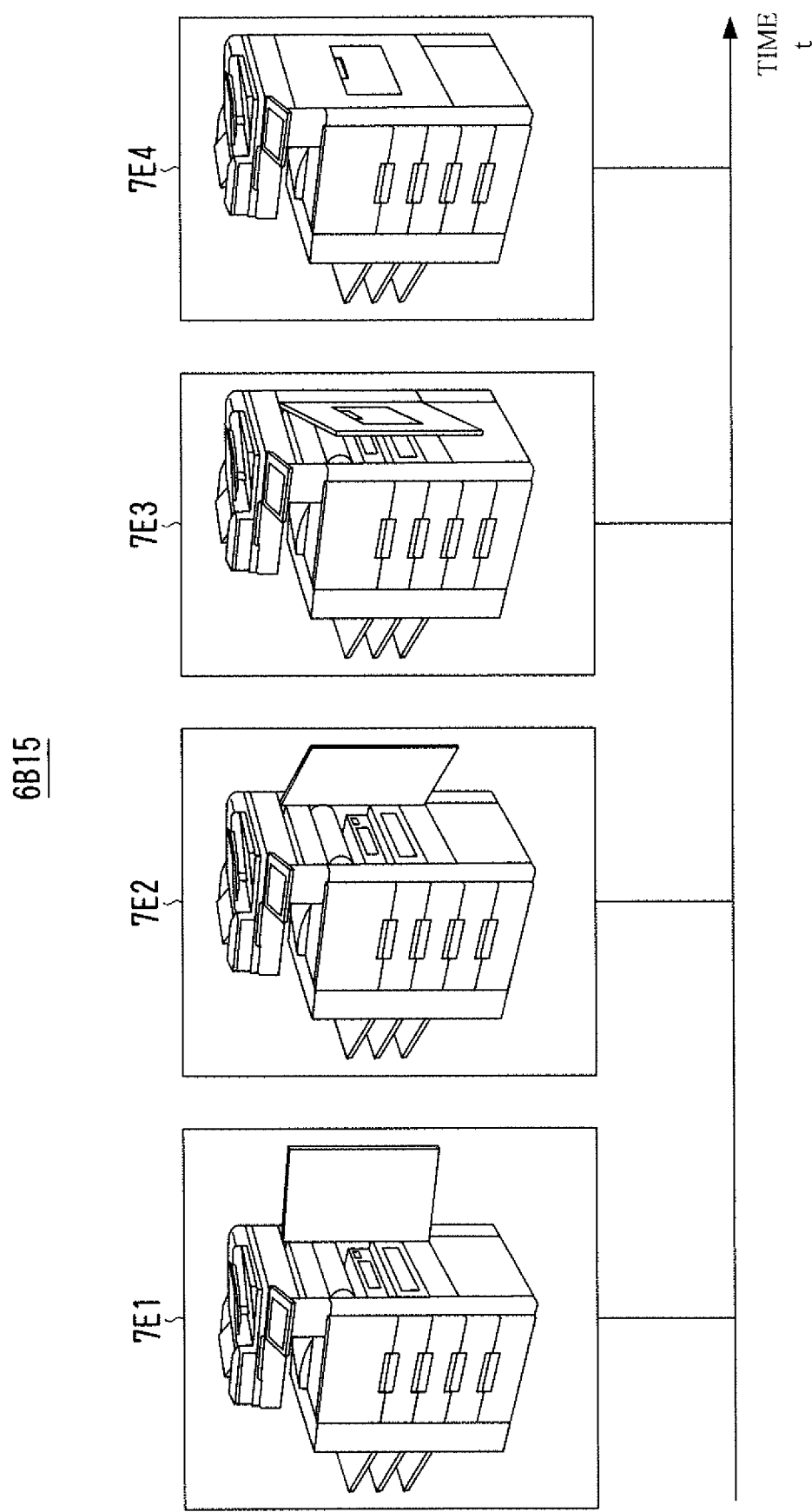
FIG. 10 is a diagram showing an example of images included in a moving image of a fifth chapter.
Figure 11:
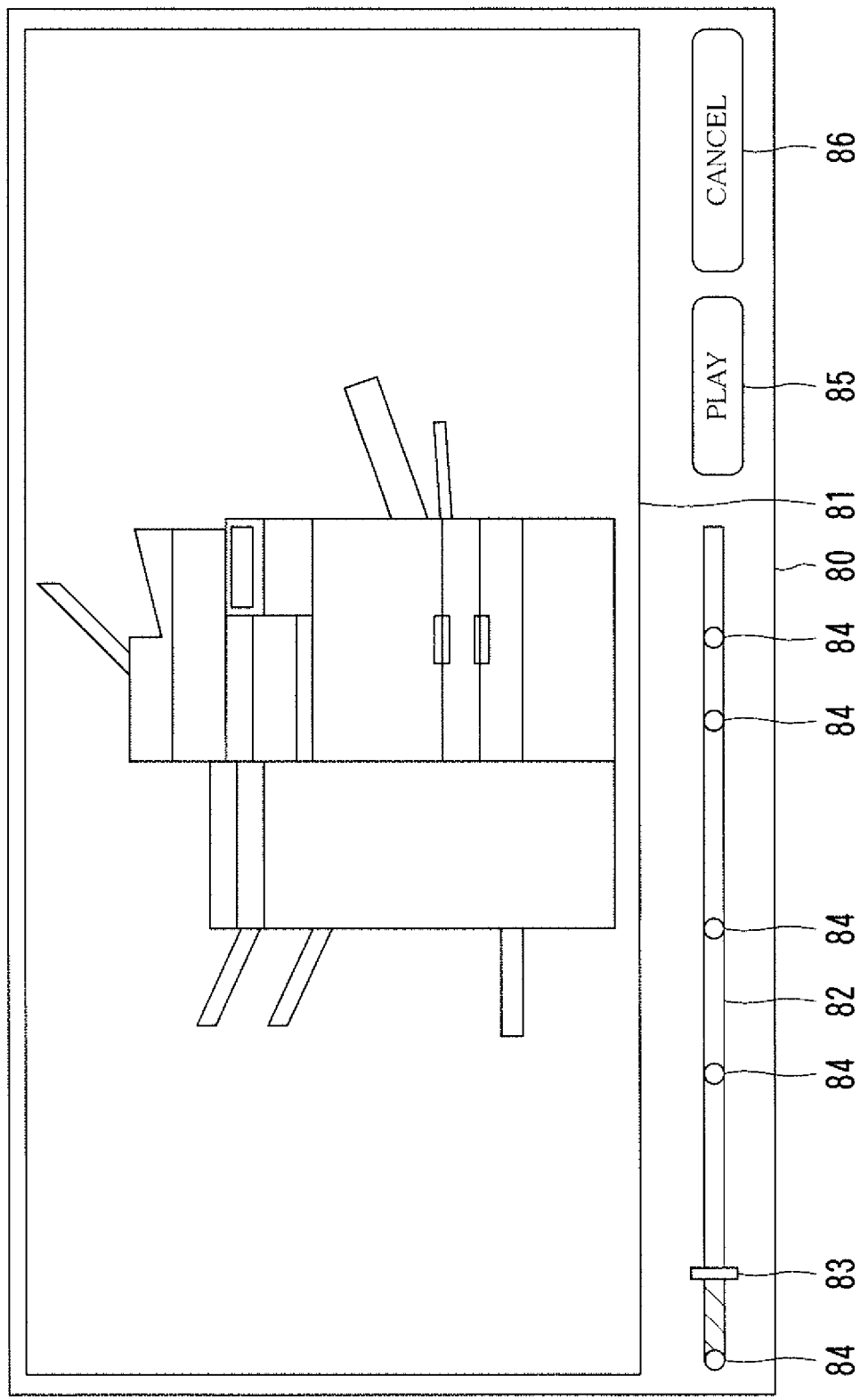
FIG. 11 is a diagram showing an example of a guidance screen.
Figure 12A:
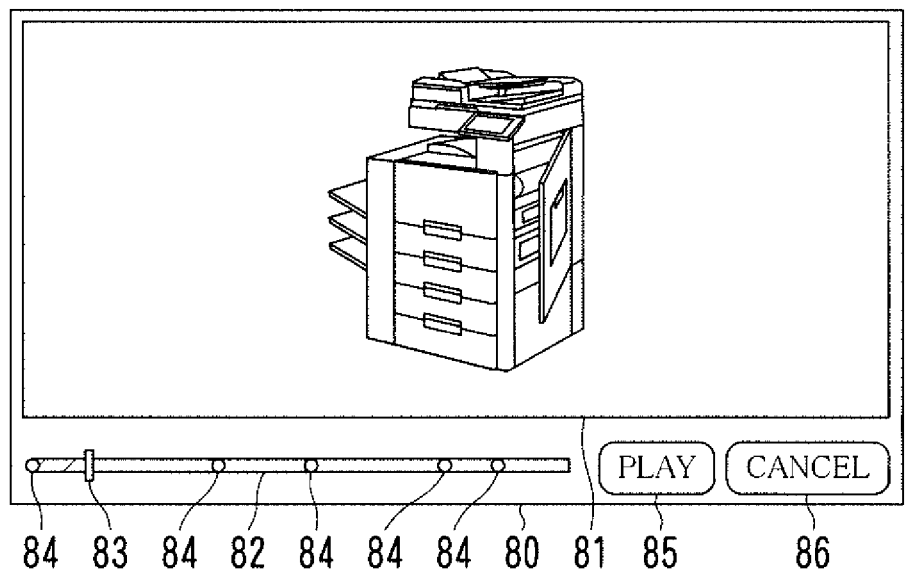
FIGS. 12A-12C are diagrams showing examples of a display form of a moving image.
Figure 12B:
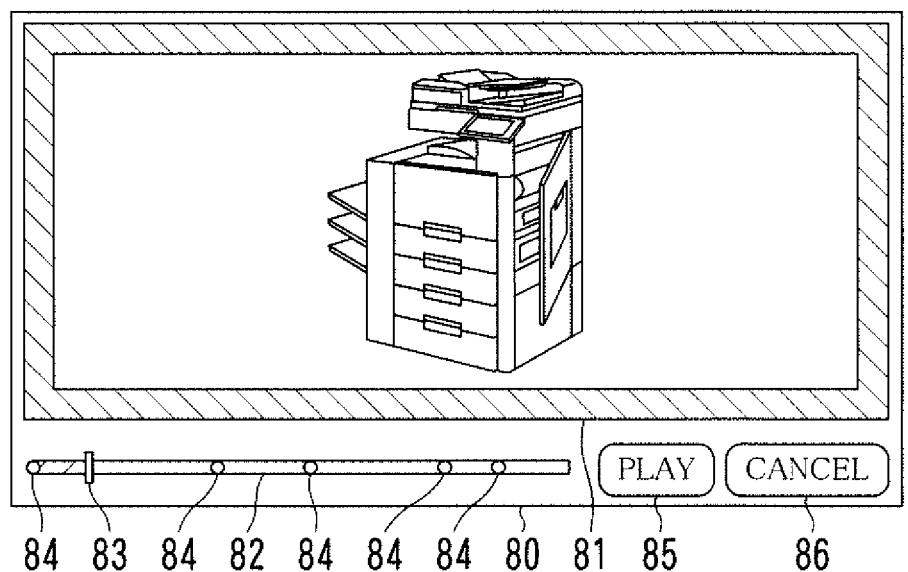
Figure 12C:
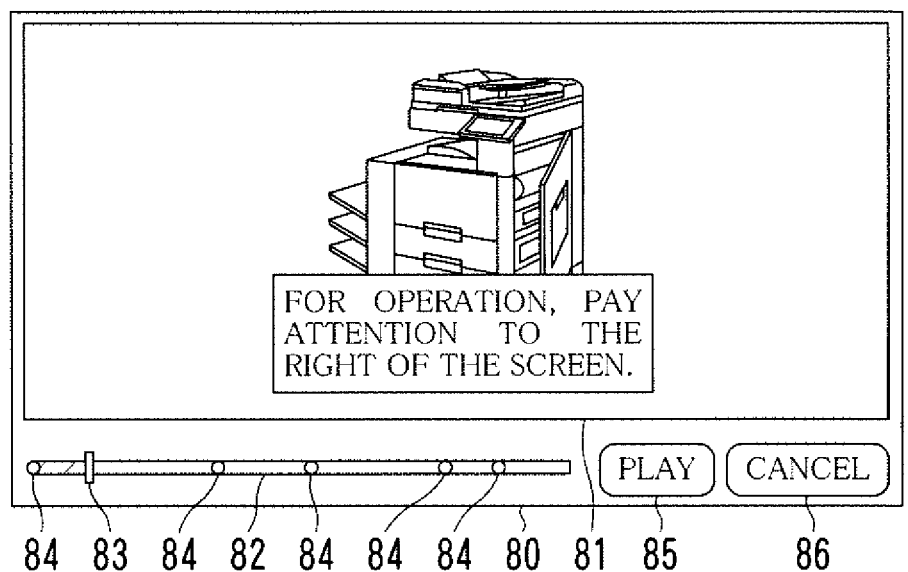

FIG. 5 is a diagram showing an example of state change data 6A. FIG. 6 is a diagram showing an example of images included in a moving image of a first chapter. FIG. 7 is a diagram showing an example of images included in a moving image of a second chapter. FIG. 8 is a diagram showing an example of images included in a moving image of a third chapter. FIG. 9 is a diagram showing an example of images included in a moving image of a fourth chapter. FIG. 10 is a diagram showing an example of images included in a moving image of a fifth chapter. FIG. 11 is a diagram showing an example of a guidance screen 80. FIGS. 12A-12C are diagrams showing examples of a display form of a moving image.

Meanwhile, in general, a user performs steps (processes, phases) according to a predetermined procedure, namely, in an orderly manner, so that the maintenance is performed completely.

In this embodiment, it is confirmed, based on the result of detection by any one of the sensors of the image forming apparatus 1, that one step is performed properly.

Referring to FIG. 5, the state change data storage portion 101 stores, in advance, the state change data 6A for each type of maintenance.

The state change data 6A shows a change in state detected by any of the sensors (state before the change and state after the change) for the case where the maintenance is performed in an orderly manner. The state change data 6A shows the change in order of steps. Hereinafter, the state change data 6A for each maintenance may be described separately as "state change data 6A1", "state change data 6A2", . . . , and so on.

For example, the state change data 6A1 is the state change data 6A on maintenance to "clear a paper jam in the fixing unit".

The state change data 6A1 shows, for each of five steps of the maintenance, a change in state for the case where the step is performed properly and a sensor detecting the change in the following manner.

The change to be detected at first is to "change the state of the right door 27 from the closed state to the open state". The right door sensor 204 detects the change.

The change to be detected secondarily is to "change the state of the lever 24c from the "up" position to the "down" position". The lever sensor 205 detects the change.

The change to be detected thirdly is to "change the state of the fixing unit 24 from paper present to no paper present". The first paper path sensor 201 detects the change.

The change to be detected fourthly is to "change the state of the lever 24c from the "down" position to the "up" position". The lever sensor 205 detects the change.

The change to be detected at last is to "change the state of the right door 27 from the open state to the closed state". The right door sensor 204 detects the change.

The state change data 6A2 is the state change data 6A on maintenance to "clear a paper jam in the printed matter path".

The state change data 6A2 shows, for each of five steps of the maintenance, a change in state for the case where the step is performed properly and a sensor detecting the change in the following manner.

The change to be detected at first is to "change the state of the right door 27 from the closed state to the open state" as with the case of clearing a paper jam in the fixing unit. The right door sensor 204 detects the change.

The change to be detected secondarily is to "change the state of the inner door 28 from the closed state to the open state". The inner door sensor 206 detects the change.

The change to be detected thirdly is to "change the state of the printed matter path 251 from paper present to no paper present". The second paper path sensor 202 detects the change.

The change to be detected fourthly is to "change the state of the inner door 28 from the open state to the closed state". The inner door sensor 206 detects the change.

The change to be detected at last is to "change the state of the right door 27 from the open state to the closed state" as with the case of clearing a paper jam in the fixing unit. The right door sensor 204 detects the change.

The change in state of the image forming apparatus 1 is made in response to a task made by the user, namely, in response to user operation on the image forming apparatus 1. It can be therefore said that the state change data 6A also shows the user's task necessary to perform the maintenance.

The state change data 6A also includes corresponding error 6AH. For example, the state change data 6A1 includes, as the corresponding error 6AH, a corresponding error 6AH1. The "corresponding error" is an error to be corrected by performing maintenance related to the state change data 6A. To be specific, for example, the corresponding error 6AH1 is an error of "paper jam in the fixing unit" and an error to which maintenance to "clear a paper jam in the fixing unit" is to be performed.

The reproduction data storage portion 102 stores, in advance, guidance data 6B for each piece of guidance. Stated differently, the reproduction data storage portion 102 stores, one by one, the guidance data 6B corresponding to the state change data 6A. Hereinafter, the guidance data 6B corresponding to the state change data 6A1, the state change data 6A2, . . . , and so on are sometimes described separately as "guidance data 6B1", "guidance data 6B2", . . . , and so on.

The guidance data 6B is data on a moving image and audio for explaining how to perform maintenance. The guidance data 6B includes step data for each step. The guidance includes chapters for each step of the maintenance.

For example, the guidance data 6B corresponding to the state change data 6A1, namely, the guidance data 6B1, includes five sets of step data 6B11-6B15. The step data 6B11-6B15 is data for reproducing the moving images and audio of the first through fifth chapters, respectively.

The step data 6B11 is used to reproduce the moving image as shown in FIG. 6. To be specific, the moving image is so reproduced to show the transition from a state where the right door 27 is closed (image 7A1), to a state where the right door 27 is opened slightly (image 7A2), to a state where the right door 27 is opened by two thirds or so (image 7A3), and to a state where the right door 27 is opened completely (image 7A4).

The images 7A1-7A4 form one frame of the moving image. Likewise, the images 7B1-7B3, the images 7C1-7C4, the images 7D1-7D3, and the images 7E1-7E4 form one frame each.

The step data 6B11 is used also to reproduce audio in line with the moving image. The same applies to the other step data described below.

The step data 6B12 is used to reproduce the moving image as shown in FIG. 7. To be specific, the moving image is so reproduced to show the transition from a state where the right door 27 is opened completely and the lever 24c is in the "up" position (image 7B1), to a state where the lever 24c is in the "middle" position (image 7B2), and to a state where the heat rollers 24a and 24b are separated away from each other and the lever 24c is in the completely "down" position (image 7B3).

The step data 6B13 is used to reproduce the moving image as shown in FIG. 8. To be specific, the moving image is so reproduced to show the transition from a state where the heat rollers 24a and 24b are separated away from each other and paper is jammed therebetween (image 7C1), to a state where the paper between the heat rollers 24a and 24b is pulled out slightly (image 7C2), to a state where the paper between the heat rollers 24a and 24b is pulled out fairly (image 7C3), and to a state where the paper is not jammed any more between the heat rollers 24a and 24b (image 7C4).

The step data 6B14 is used to reproduce the moving image as shown in FIG. 9. To be specific, the moving image is so reproduced to show the transition from a state where the heat rollers 24a and 24b are separated away from each other and the lever 24c is in the completely "down" position (image 7D1), to a state where the lever 24c is in the "middle" position (image 7D2), and to a state where the lever 24c is in the completely "up" position (image 7D3).

The step data 6B15 is used to reproduce the moving image as shown in FIG. 10. To be specific, the moving image is so reproduced to show the transition from a state where the right door 27 is opened completely (image 7E1), to a state where the right door 27 is closed slightly (image 7E2), to a state where the right door 27 is closed by two thirds or so (image 7E3), and to a state where the right door 27 is closed completely (image 7E4).

In addition, the step data for each step indicates a time of the top of the moving image of that step in the guidance. Suppose, for example, that the moving images of the five steps of the guidance reproduced based on the guidance data 6B1 have lengths of "1 minute and 30 seconds", "45 seconds", "1 minute and 5 seconds", "25 seconds", and "35 seconds", respectively. In such a case, the step data 6B11-6B15 indicate, as the time of the top, a timestamp of "0 minute 0 second", "1 minute 30 seconds", "2 minutes 15 seconds", "3 minutes 20 seconds", and "3 minutes 45 seconds", respectively.

The step data for each step includes a regular time. The regular time is time necessary for the user to complete a step while viewing a chapter for the corresponding step. Such a regular time is hereinafter referred to as "required time Tmax". The required time Tmax has a length equal to or longer than the length (play duration) of the chapter.

The guidance screen displaying portion 103 displays, in response to a predetermined command entered, the guidance screen 80 as shown in FIG. 11 in the touch-sensitive panel display 10e.

The guidance screen 80 has a moving image window 81, a progress bar 82, a cursor 83, chapter buttons 84, a play button 85, a cancel button 86, and so on.

In the moving image window 81, a message for prompting the user to perform maintenance to clear an error, a moving image of guidance to be reproduced (hereinafter, referred to as "target guidance"), or the like is displayed. The target guidance is designated by the user. Alternatively, the guidance screen displaying portion 103 may select, as the target guidance, guidance on how to perform maintenance to clear an error occurred based on the state change data 6A (see FIG. 5). For example, if a paper jam error occurs in the fixing unit 24, then guidance on the maintenance to "clear a paper jam in the fixing unit" is preferably selected as the target guidance.

The play button 85 is a button for the user to give a command to start playing the target guidance.

The progress bar 82 is to visualize how far the target guidance is played. The length L of the horizontal width of the progress bar 82 corresponds to the length of a time necessary to play the target guidance from the top to the end thereof at a normal speed (single speed). Such a time is hereinafter referred to as a "play duration T0". The left edge and the right edge of the progress bar 82 correspond to the top and the end of the target guidance, respectively.

The cursor 83 is provided on the progress bar 82. The cursor 83 moves in line with the time at which the target guidance is currently played. The time is hereinafter referred to as a "current play time Pg". The cursor 83 is also to visualize how far the target guidance is played. Suppose, for example, that the play duration T0 is "3 minutes and 30 seconds" and the current play time Pg is "1 minute 10 seconds". In such a case, the cursor 83 is positioned on the right side, by L/3, from the left edge of the progress bar 82.

The chapter buttons 84 are provided on the progress bar 82 so that one chapter button 84 corresponds to one chapter. The chapter buttons 84 are provided each at the position corresponding to the time of the top of the corresponding chapter.

The progress bar 82 is displayed in a different format on the sides of the cursor 83. For example, the progress bar 82 is displayed in red color on the left side of the cursor 83, and displayed in white color on the right side thereof. Stated differently, the different format on the sides of the cursor visualizes how far the target guidance is played. As described above, the cursor 83 indicates the progress of how far the target guidance is played by using the location of the cursor 83 in the progress bar 82. The default position of the cursor 83 is on the left edge of the progress bar 82.

The user drags the cursor 83 to move the same to any position on the progress bar 82. Alternatively, the user taps any position on the progress bar 82 to move the cursor 83 to the tapped position. Alternatively, the user taps the chapter button 84 to move the cursor 83 to the position of the tapped chapter button 84. The user performs these operations to jump the playback progress to any point in time then to cause the target guidance to be played from the point in time.

The jump destination time determination portion 104 determines, in response to operation made on the progress bar 82, the cursor 83, or the chapter button 84, to which point in time of the target guidance the playback progress is to be jumped. Hereinafter, the time corresponding to the jump destination is referred to as "jump destination time Ps".

The jump destination time determination portion 104 moves the cursor 83 in accordance with dragging or tapping by the user. To be specific, the jump destination time determination portion 104 moves the cursor 83 to a position designated with the progress bar 82, the cursor 83, or the chapter button 84. Such a position is hereinafter referred to as a "designated position". The jump destination time determination portion 104 then determines that a time corresponding to the designated position is the jump destination time Ps.

Suppose, for example, that the play duration T0 is "3 minutes and 30 seconds" and the designated position is a position which is L/6 rightward away from the left edge of the progress bar 82. In such a case, the jump destination time determination portion 104 determines that the jump destination time Ps is "0 minutes 35 seconds".

In the meantime, the image forming apparatus 1 has, as guidance play modes (hereinafter, referred to as "play mode(s)"), a normal mode and a beginner mode. The normal mode is provided for an experienced user who is accustomed to performing maintenance on the image forming apparatus 1 while the beginner mode is provided for an inexperienced user. The default play mode is the normal mode.

The moving image reproducing portion 107 displays a moving image of target guidance in the moving image window 81 of the guidance screen 80 based on the guidance data 6B on the target guidance. In short, the moving image reproducing portion 107 reproduces the moving image of the target guidance.

To be specific, the moving image reproducing portion 107 reproduces the moving image as discussed below in accordance with operation by the user or the result of processing by the jump destination time determination portion 104.

When the user taps on the play button 85, the moving image reproducing portion 107 reads out the guidance data 6B on the target guidance from the reproduction data storage portion 102. The moving image reproducing portion 107 sets the first chapter of the target guidance at a current chapter. The moving image reproducing portion 107 then plays, based on the guidance data 6B, the current chapter in a form based on the play mode. Since the default play mode is the normal mode, the moving image reproducing portion 107 plays the current chapter in a form based on the normal mode at first when the play button 85 is tapped on. The form based on the play mode is described later.

When the user operates the progress bar 82 or the cursor 83 with the target guidance played, the jump destination time determination portion 104 determines jump destination time Ps as discussed above. In response to the determination, the moving image reproducing portion 107 jumps the playback progress to the jump destination time Ps and then continues to play the moving image from the jump destination time Ps.

Suppose, for example, that the jump destination time Ps is determined to be "1 minute 10 seconds" while the moving image corresponding to the time "45 seconds" is played. In such a case, the moving image reproducing portion 107 skips the playback progress to the position of "1 minute 10 seconds" and then plays the moving image from the position. In another example, if the jump destination time Ps is determined to be "25 seconds", then the moving image reproducing portion 107 puts the playback progress back to the position of "25 seconds" and then plays the moving image from the position.

Even after finishing playing the current chapter, the moving image reproducing portion 107 does not go forward to the next chapter as long as a step corresponding to the current chapter (hereinafter, referred to as a "current step") has not yet been completed. Even when the user operates the progress bar 82 or the like to designate a position of a chapter later than the current chapter during the play of the current chapter or after finishing playing the current chapter, the moving image reproducing portion 107 does not jump the playback progress to the position designated.

The audio reproducing portion 108 controls, based on the guidance data 6B on the target guidance, the audio unit 10k in such a manner that audio is outputted in line with the display of the moving image by the moving image reproducing portion 107.

The time measurement portion 109 measures a time which has elapsed since the current chapter started to be played. Such a time is hereinafter referred to as an "elapsed time Tk". To be specific, the time measurement portion 109 starts measuring the elapsed time Tk when the play button 85 is tapped on and the first chapter starts to be played as the current chapter. Thereafter, when the next chapter starts to be played as the current chapter, the time measurement portion 109 resets the elapsed time Tk at 0 (zero) and then starts measuring the elapsed time Tk.

The user taps on the play button 85 so that the target guidance starts to be played. The user then performs the steps of the maintenance in accordance with the target guidance. Any of the sensors detects a change in state.

The task success/failure determination portion 105 determines whether or not the current step has been completed within a required time Tmax for the current step. The determination is made based on the results of detection by the sensors or the elapsed time Tk in the following manner.

When any of the sensors detects a change in state, the task success/failure determination portion 105 reads out state change data 6A on maintenance corresponding to the target guidance. The task success/failure determination portion 105 then compares a change in state indicated for the current step in the state change data 6A (see FIG. 5) and the change in state detected by the sensor.

If there is a match therebetween, then the task success/failure determination portion 105 determines that the current step has been completed. If there is no match therebetween, then the task success/failure determination portion 105 determines that the current step has failed.

Suppose that maintenance on the target guidance is to "clear a paper jam in the fixing unit" and the current step is the first step. In such a case, if the right door sensor 204 detects a change of the right door 27 from the closed state to the open state, then the task success/failure determination portion 105 determines, based on the state change data 6A1, that the current step has been completed. In contrast, if the upper front door sensor 203 detects a change of the upper front door 26 from the closed state to the open state, then the task success/failure determination portion 105 determines that the current step has failed.

Alternatively, where the elapsed time Tk reaches the required time Tmax for the current chapter without detection of a change by the sensors, the task success/failure determination portion 105 determines that the current step has failed.

The number of failures counting portion 106 counts the number of times at which the current step has failed (hereinafter, referred to as the "number of failures Cf"). To be specific, every time the task success/failure determination portion 105 determines that the current chapter has failed, the number of failures counting portion 106 adds "1" to the number of failures Cf. The initial values of the number of failures Cf is "0 (zero)".

Where the task success/failure determination portion 105 determines that the current chapter has been successfully completed, the moving image reproducing portion 107 and the audio reproducing portion 108 start playing the next chapter if there is the next chapter after the current chapter. The next chapter is then designated as the current chapter. Where the beginner mode is used as the play mode, the play mode is changed from the beginner mode to the normal mode.

Where the task success/failure determination portion 105 determines that the current chapter has failed, the moving image reproducing portion 107 and the audio reproducing portion 108 play the current chapter again from the top thereof in a form based on the normal mode, provided that the number of failures Cf does not reach a threshold Nt (three, for example). At this time, the time measurement portion 109 makes another measurement of the elapsed time Tk from zero (0) seconds. The threshold Nt is an integer equal to or greater than one. The threshold Nt can be set arbitrarily by an administrator.

When the number of failures Cf reaches the threshold Nt, the moving image reproducing portion 107 and the audio reproducing portion 108 change the play mode from the normal mode to the beginner mode. The moving image reproducing portion 107 and the audio reproducing portion 108 then play the current chapter in a form based on the beginner mode. At this time, the elapsed time Tk and the number of failures Cf are reset. While the beginner mode is used as the play mode, the elapsed time Tk is not measured and the number of failures Cf is not counted. Alternatively, the number of failures Cf may be counted; however switching the play mode is not performed because the beginner mode is already set. It is desirable, also in the beginner mode, to repeat playing the current chapter until the current step is successfully completed.

Where the cancel button 86 is tapped on, the moving image reproducing portion 107 and the audio reproducing portion 108 stop playing the target guidance. The moving image reproducing portion 107 and the audio reproducing portion 108 then reset the number of failures Cf to "0 (zero)", change the current chapter to the first chapter, and then makes a record of a chapter of the completed step.

Thereafter, where the play button 85 is tapped on again, the moving image reproducing portion 107 and the audio reproducing portion 108 designate, in the target guidance, a chapter corresponding to an incomplete chapter as the current chapter, and start playing the target guidance from the current chapter. Alternatively, as to chapters corresponding to the completed step, the moving image reproducing portion 107 and the audio reproducing portion 108 may play the target guidance in the normal mode from the first chapter in order. As to a chapter corresponding to the incomplete step, as discussed above, the target guidance may be played by changing the play mode to the beginner mode appropriately in accordance with the elapsed time Tk or the number of failures Cf.

The description goes on to a form how to play the guidance in each of the normal mode and the beginner mode.

Where the normal mode is designated as the play mode, the moving image reproducing portion 107 plays the guidance without emphasizing the moving image as shown in FIG. 12A. The audio reproducing portion 108 reproduces sound at a volume level set in the image forming apparatus 1 (hereinafter, referred to as a "set volume level").

Where the beginner mode is designated as the play mode, the moving image reproducing portion 107 plays the guidance so as to emphasize the edge of the moving image as shown in FIG. 12B. For example, the moving image reproducing portion 107 plays the guidance so that the moving image is enclosed by a red frame. The frame may be configured to blink also. The audio reproducing portion 108 reproduces sound at a volume level larger than the set volume level.

Where the normal mode is designated as the play mode, the moving image reproducing portion 107 plays the moving image at a usual speed (normal speed). The audio reproducing portion 108 also reproduces the sound at the normal speed.

Where the beginner mode is designated as the play mode, the moving image reproducing portion 107 plays the moving image at a speed slower than the normal speed (0.7 times speed, for example). The audio reproducing portion 108 reproduces the sound at the same speed as that of the moving image.

Where the normal mode is designated as the play mode, the moving image reproducing portion 107 plays the moving image without adding, to the moving image, a message for drawing user's attention.

Where the beginner mode is designated as the play mode, the moving image reproducing portion 107 plays the moving image with a message for drawing user's attention added for the first few seconds as shown in FIG. 12C. Alternatively, the message may be played for a few seconds before the chapter is played.

Where the normal mode is designated as the play mode, the moving image reproducing portion 107 plays the moving image in the moving image window 81. Where the beginner mode is designated as the play mode, the moving image may be played in the entirety of the touch-sensitive panel display 10e. In short, the moving image may be played in full-screen.

Alternatively, contents (moving image and sound) for the normal mode and contents for the beginner mode are prepared for each chapter. The detailed operation is given in the contents for the beginner mode as compared to the contents for the normal mode. For example, a chapter for the beginner mode corresponding to the step of lowering the lever 24c may include contents for explaining how to put fingers onto the lever 24c by zooming up the lever 24c.

Figure 13:
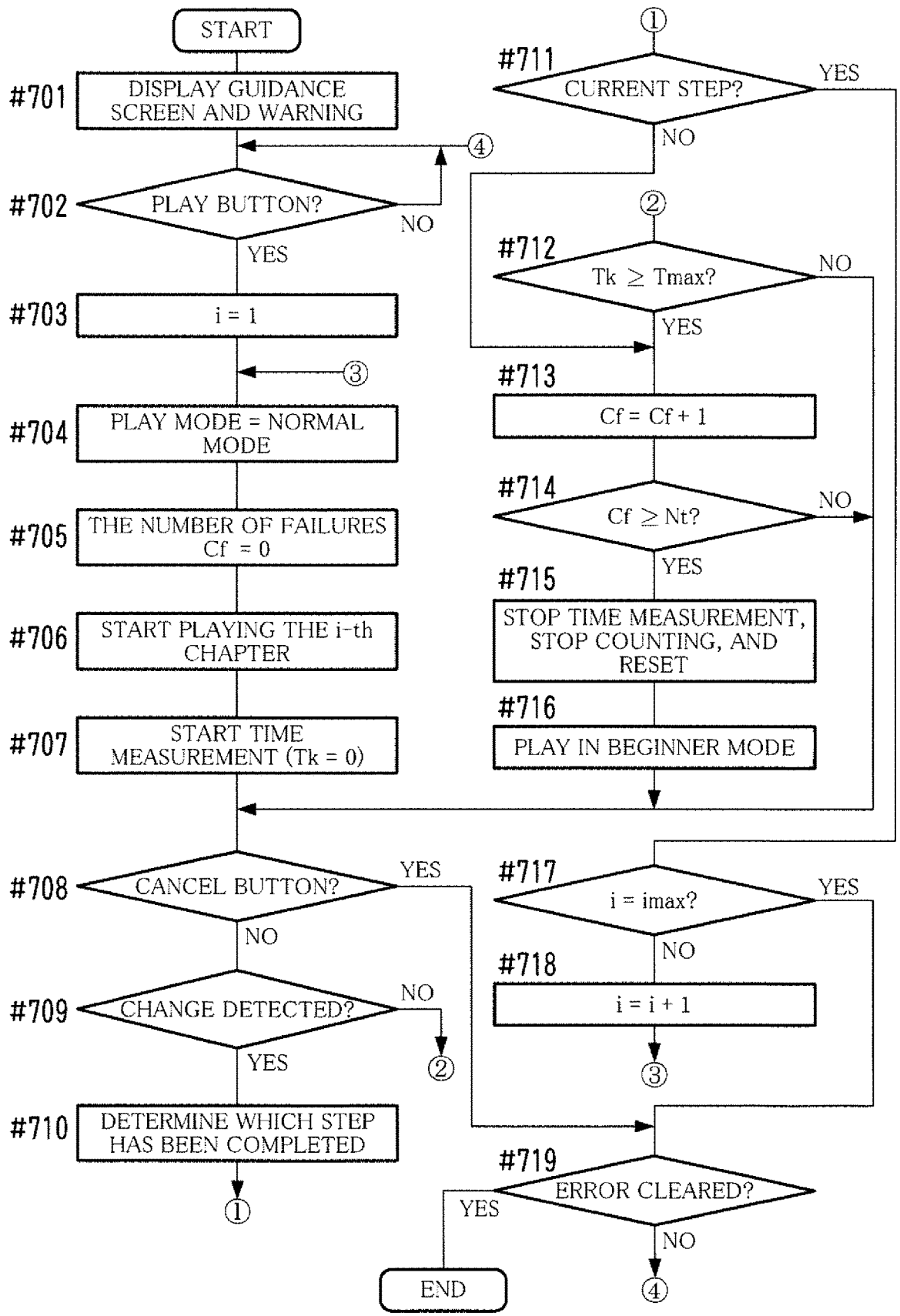
FIG. 13 is a flowchart depicting an example of the flow of the entire processing for displaying guidance in an image forming apparatus.

FIG. 13 is a flowchart depicting an example of the flow of the entire processing for displaying the guidance in the image forming apparatus 1.

The description goes on to the flow of the entire processing for displaying the guidance. The description is provided with reference to the flowchart.

The image forming apparatus 1 performs the processing based on the guidance reproducing program 10P in accordance with the steps shown in FIG. 13.

When an error occurs, the image forming apparatus 1 displays the guidance screen 80 as shown in FIG. 11 (Step #701 of FIG. 13). At this time, a message for prompting the user to perform maintenance to clear the error is arranged in the moving image window 81.

In response to the play button 85 tapped on (YES in Step #702), the image forming apparatus 1 performs processing for playing, as the target guidance, guidance on the maintenance in the following manner.

The image forming apparatus 1 makes the following initial settings. To be specific, the image forming apparatus 1 designates, as the current chapter, the first chapter (Step #703). The image forming apparatus 1 designates, as the play mode, the normal mode (Step #704). The image forming apparatus 1 resets the number of failures Cf to "0 (zero)" (Step #705). The image forming apparatus 1 then starts playing the current chapter (Step #706) and also starts timing the elapsed time Tk from 0 (zero) seconds (Step #707). In this way, the current chapter is played in a form suitable for the normal mode.

In response to the cancel button 86 tapped on (YES in Step #708), the image forming apparatus 1 stops playing the target guidance. Then, if the error has not yet been cleared (NO in Step #719), then the processing goes back to Step #702 and tapping on the play button 85 is waited.

When detecting a change in state (NO in Step #708 and YES in Step #709), the image forming apparatus 1 determines which step completion has caused the change (Step #710). If the change is not caused in association with the completion of the current step (NO in Step #711), namely, if the user performs incorrect operation, then the image forming apparatus 1 adds "1" to the number of failures Cf (Step #713).

Where the elapsed time Tk reaches the required time Tmax for the step with no change in state detected (NO in Step #709 and YES in Step #712), the image forming apparatus 1 also adds "1" to the number of failures Cf (Step #713).

Where the number of failures Cf reaches the threshold Nt (YES in Step #714), the image forming apparatus 1 resets the number of failures Cf to "0 (zero)" and stops making measurement of the elapsed time Tk and counting the number of failures Cf (Step #715). The image forming apparatus 1 changes the play mode from the normal mode to the beginner mode and then plays the current chapter from the top in a form suitable for the beginner mode (Step #716). The processing goes back to Step #708.

Where the current chapter has been completed (YES in Step #711), the image forming apparatus 1 designates, as the current chapter, the next chapter (Step #718), provided that the current chapter is not the final chapter (NO in Step #717). The processing then goes back to Step #704. The image forming apparatus 1 designates, as the play mode, the normal mode (Step #704), resets the number of failures Cf to "0 (zero)" (Step #705), and starts playing a new current chapter (Step #706). At this time, the image forming apparatus 1 starts timing the elapsed time Tk from 0 (zero) seconds (Step #707).

Thereafter, the image forming apparatus 1 performs the processing from Step #708 to Step #718 appropriately. Where the error is cleared (YES in Step #719), the image forming apparatus 1 finishes the processing for playing the target guidance.

According to this embodiment, the image forming apparatus 1 plays the guidance while changing, for each step, the form based on a state of operation by the user. Thus, it is possible to provide guidance suitable for a user more easily than is conventionally possible without preparing different editions of the guidance.

Figure 16A:
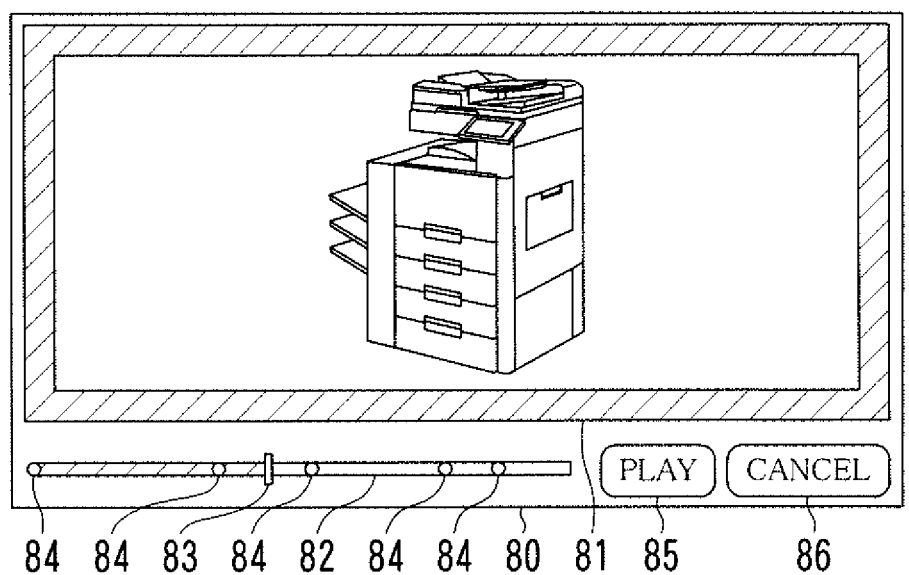
FIGS. 16A-16C are diagrams showing examples of a display form of a moving image.
Figure 16B:
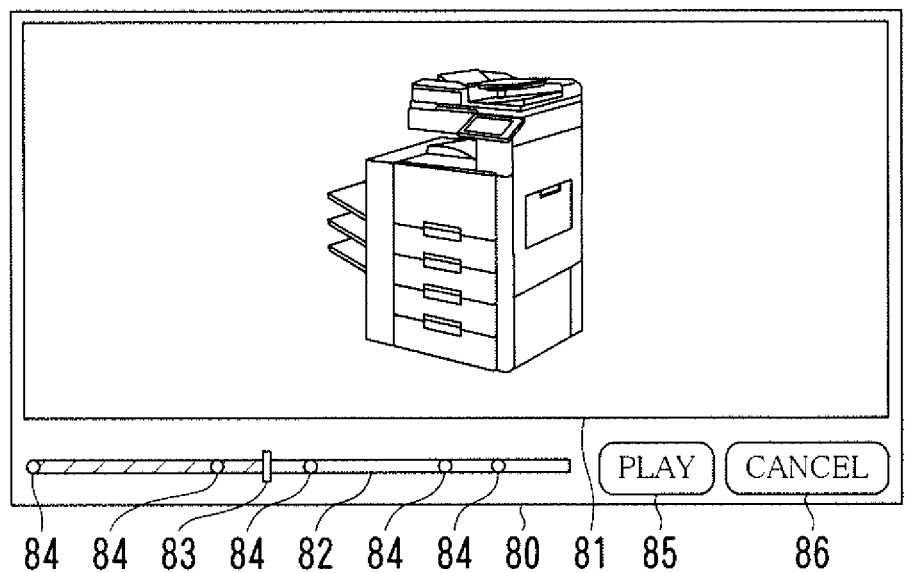
Figure 16C:
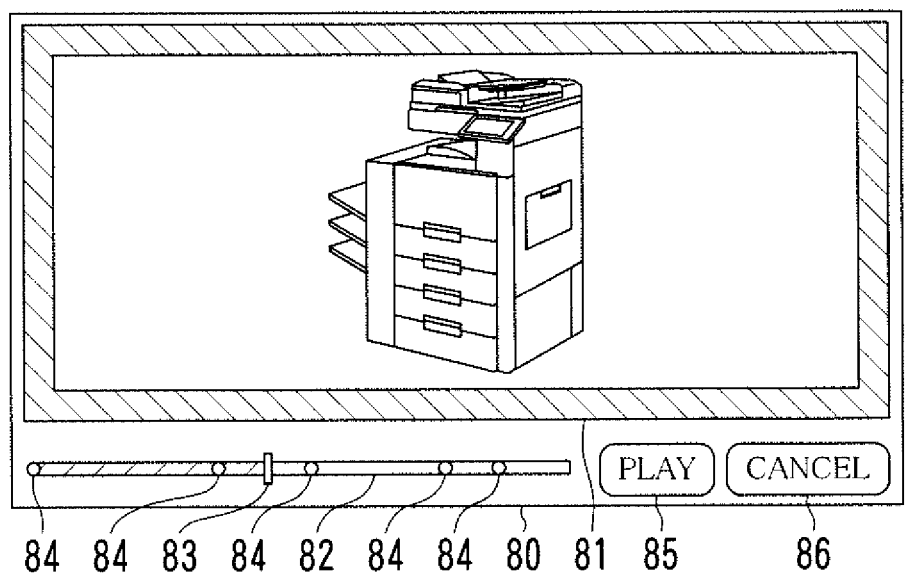

FIG. 14 is a diagram showing an example of number of failures data 6E. FIG. 15 is a diagram showing an example of special step data 6F. FIGS. 16A-16C are diagrams showing examples of a display form of a moving image.

In this embodiment, the number of failures Cf is used at real time. Instead of this, however, for each user, the number of failures Cf in each step of maintenance may be recorded as the number of failures Cg for the next reproduction. To be specific, for each user and each maintenance, the number of failures data 6E indicating the number of failures Cg in each step is generated and the number of failures data 6E thus generated is stored into the auxiliary storage 10d and so on. For example, as for the maintenance to clear a paper jam in the fixing unit, the number of failures data 6E having the content as shown in FIG. 14 is stored.

Suppose that an error occurs while a user uses the image forming apparatus 1 and the user has ever performed the maintenance to clear the error. In such a case, the moving image reproducing portion 107 and the audio reproducing portion 108 reproduce, as the target guidance, guidance corresponding to the maintenance in the following manner.

The moving image reproducing portion 107 and the audio reproducing portion 108 designate, as the play mode, the normal mode for a step of the maintenance. In the step, the number of failures Cg indicated in the number of failures data 6E does not reach the threshold Nt. The moving image reproducing portion 107 and the audio reproducing portion 108 then play a chapter corresponding to the step in a form suitable for the normal mode. At this time, counting the number of failures Cf and making measurement of the elapsed time Tk are performed. Where the foregoing conditions are met, the image forming apparatus 1 changes the play mode from the normal mode to the beginner mode and then plays the chapter.

In contrast, as for a step in which the number of failures Cg indicated in the number of failures data 6E reaches the threshold Nt, the moving image reproducing portion 107 and the audio reproducing portion 108 designate, as the play mode, the beginner mode. The moving image reproducing portion 107 and the audio reproducing portion 108 then play a chapter corresponding to the step in a form suitable for the beginner mode instead of playing the chapter in a form suitable for the normal mode.

Suppose that, for example, the threshold Nt is "3" and the number of failures data 6E for a logged-in user is number of failures data 6E1. In such a case, a chapter corresponding to the third step is played in a form suitable for the beginner mode from the beginning. The chapter corresponding to the other steps is played at first in a form suitable for the normal mode.

In the foregoing embodiment, the image forming apparatus 1 changes the play mode from the normal mode to the beginner mode when the number of failures Cf reaches the threshold Nt. Instead of this, however, the beginner mode may be set as the default play mode only for the following three chapters: a chapter corresponding to a first type of step which is a step causing a substantial influence on the image forming apparatus 1 if the step is not performed properly; a chapter corresponding to a second type of step which is a step involving difficult operation on a complex structure; and a chapter corresponding to a third type of step which is a step involving a risk when the predetermined conditions are met. In short, as for the three chapters only, the default play mode may be switched to the beginner mode.

In such a case, before the play mode is changed to the beginner mode for playing, a message for drawing user's attention may be displayed or outputted as sound for a few seconds. Such a message is, for example, as follows: "Notice: the next operation involves a risk. Attention should be paid to the guidance and operation should be performed with care".

The first through third types of steps may be defined as special step data 6F in advance for each maintenance, and stored in the auxiliary storage 10d. For example, as for the maintenance to clear a paper jam in the fixing unit, the special step data 6F as shown in FIG. 15 is prepared. The special step data 6F indicates "YES" in some fields, which means that the attribute shown on the left side is true. In the example of FIG. 15, the second step (Step_2) corresponds to both the first type of step and the second type of step. The special step data 6F indicates "risk parameter", which means that the foregoing predetermined conditions involves a risk. In the example of FIG. 15, the third step (Step_3) corresponds to the third type of step. To be specific, the step involves a risk when the temperature of the fixing unit 24 reaches 80 degrees or above.

The image forming apparatus 1 plays the guidance on the maintenance for the first, fourth, and fifth chapters always in the normal mode independently of the number of failures Cf.

As for the second chapter, however, the image forming apparatus 1 plays the guidance by changing the play mode to the beginner mode appropriately in accordance with the number of failures Cf and so on because at least one of the two attributes shows "YES". As for the third chapter, the image forming apparatus 1 plays the guidance always in the normal mode when the temperature informed by the fixing unit 24 is below 80 degrees. However, when the temperature informed by the fixing unit 24 is 80 degrees or above, the image forming apparatus 1 plays the guidance by changing the play mode to the beginner mode appropriately in accordance with the number of failures Cf and so on.

The image forming apparatus 1 may play the guidance for the second chapter or the third chapter by changing the play mode to the beginner mode from the beginning.

When the user performs operation different from that of the original steps, the image forming apparatus 1 may display a message for prompting the user to undo the operation. When detecting a change in state in response to the undo operation, the image forming apparatus 1 does not have to add "1" to the number of failures Cf.

In this embodiment, the image forming apparatus 1 counts the number of failures Cf Instead of this, however, the image forming apparatus 1 may change the play mode to the beginner mode as soon as the elapsed time Tk reaches the required time Tmax.

In this embodiment, the image forming apparatus 1 adds "1" to the number of failures Cf also when the elapsed time Tk reaches the required time Tmax. Instead of this, however, the image forming apparatus 1 may not perform such addition.

In the case of not performing the addition, the image forming apparatus 1 may play the guidance in different forms for the following three cases: a first case where the user performs operation in a way different from the original steps although the number of failures Cf does not reach the threshold Nt; a second case where the elapsed time Tk reaches the required time Tmax although the number of failures Cf does not reach the threshold Nt; and a third case where the number of failures Cf reaches the threshold Nt although the elapsed time Tk does not reach the required time Tmax.

For example, in the first case, the image forming apparatus 1 plays the moving image by emphasizing an edge thereof as shown in FIG. 16A. The moving image may be reproduced so as to be surrounded, for example, by a red frame. In addition, the frame may be configured to blink. In the second case, the progress bar 82 for the current chapter may be displayed in a different way on the sides of the cursor 83 as shown in FIG. 16B. To be specific, the progress bar 82 is displayed, for example, in yellow on the right side of the cursor 83. In addition, that part may be configured to blink. In the third case, the image forming apparatus 1 plays the moving image by emphasizing the edge thereof as shown in FIG. 16C. However, the edge is emphasized in a manner different from that of the first case. For example, the moving image may be played so as to be surrounded, for example, by a yellow frame. In addition, the frame may be configured to blink.

In this embodiment, the image forming apparatus 1 reproduces guidance. Instead of this, a terminal capable of performing communication with the image forming apparatus 1, for example, a smartphone or a tablet computer, may reproduce guidance.

In such a case, the terminal preferably downloads, from the image forming apparatus 1, the data stored in the state change data storage portion 101 or the reproduction data storage portion 102. The terminal preferably receives, from the image forming apparatus 1, a result of detection by the sensors. The terminal is preferably provided with the guidance screen displaying portion 103, the jump destination time determination portion 104, the task success/failure determination portion 105, the number of failures counting portion 106, the moving image reproducing portion 107, the audio reproducing portion 108, and the time measurement portion 109. Instead of the touch-sensitive panel display 10e and the audio unit 10k, a touch-sensitive panel display and an audio unit of the terminal are preferably used.

In this embodiment, the foregoing description takes the example in which the guidance on how to clear a paper jam is played. The present invention is also applicable to a case of playing other guidance. For example, the present invention is also applicable to a case of playing guidance on how to replace consumables such as a drum or toner cartridge, guidance on how to add paper to the paper feed section 22 or the paper feed cabinet 23, or guidance on how to conduct printing using a manual feed tray.

It is to be understood that the configuration of the image forming apparatus 1, the constituent elements thereof, the content of the processing, the order of the processing, the structure of the data, the structure of the screen, and the like may be appropriately modified without departing from the spirit of the present invention.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus, comprising:
a hardware processor;
a printing unit configured to perform printing;
a tray for loading paper therein;
a paper path on which to convey a printed matter;
a door configured to cover the paper path; and
an output device configured to output an image or audio;
wherein:
the hardware processor determines a completed step based on a change in state of a target on which a task is to be performed, the completed step being a step which has been completed,
the hardware processor causes the output device to reproduce an unfinished part in a first form where a predetermined condition is not satisfied, and causes the output device to reproduce the unfinished part in a second form different from the first form where the predetermined condition is satisfied, the unfinished part being a part corresponding to an unfinished step which is not determined to have been completed, and
the task is one of:
a first task for clearing a paper jam,
a second task for replacing consumables used for printing, and
a third task for adding paper to a tray.

2. The image forming apparatus according to claim 1, wherein the hardware processor causes the output device to repeatedly reproduce the unfinished part of the unfinished step until it is determined that the unfinished step is the completed step.

3. The image forming apparatus according to claim 1, wherein the predetermined condition is that although the change is detected a predetermined number of times, it is not determined that the unfinished step is the completed step based on each of the changes.

4. The image forming apparatus according to claim 3, wherein the predetermined condition further includes a condition that the target is substantially influenced by performing the unfinished step in an incorrect manner, or, alternatively, the unfinished step is a difficult step to perform.

5. The image forming apparatus according to claim 3, wherein the predetermined condition further includes a condition that a section related to the unfinished step is in a dangerous state for a user.

6. The image forming apparatus according to claim 1, wherein the predetermined condition is that a predetermined amount of time elapses after the unfinished part starts to be reproduced.

7. The image forming apparatus according to claim 1, wherein the predetermined condition is that a sum of a number of times that although the change is detected, it is not determined that the unfinished step is the completed step based on the detected change and a number of times that a unit time elapses after the unfinished part starts to be reproduced reaches a predetermined number of times.

8. The image forming apparatus according to claim 1, wherein the predetermined condition is that a sum of a number of times that although the change is detected when a user of the target previously watches the unfinished part, it is not determined that the unfinished step is the completed step based on the detected change and a number of times that a unit time elapses after the unfinished part starts to be reproduced reaches a predetermined number of times.

9. The image forming apparatus according to claim 1, wherein:
guidance is reproduced in form of a moving image or audio, and
the second form is slower than the first form in speed.

10. The image forming apparatus according to claim 1, wherein:
guidance is reproduced for the task including a plurality of steps in form of audio, and
the second form is larger than the first form in volume level.

11. The image forming apparatus according to claim 1, wherein
guidance is reproduced for the task including a plurality of steps in form of a moving image, and
the moving image is surrounded by a thicker frame in the second form than in the first form.

12. The image forming apparatus according to claim 1, wherein, in the second form, guidance is reproduced for the task including a plurality of steps with a message for drawing user's attention added to a top of the guidance.

13. The image forming apparatus according to claim 1, wherein
the predetermined condition is any one of a first condition that although the change is detected a predetermined number of times, it is not determined that the unfinished step is the completed step based on each of the changes and a second condition that a unit time elapses predetermined number of times after the unfinished part starts to be reproduced, and
the hardware processor causes the output device to reproduce the unfinished part in different forms for a case where the first condition is satisfied and for a case where the second condition is satisfied.

14. The image forming apparatus according to claim 1, wherein:
the one task is the first task, and
the first task comprises, in this order, a first step of opening the door, a second step of removing the printed matter from the paper path, and a third step of closing the door.

15. A method comprising:
determining a completed step based on a change in state of a target on which a task is to be performed, the completed step being a step which has been completed; and
reproducing an unfinished part in a first form where a predetermined condition is not satisfied, and reproducing the unfinished part in a second form different from the first form where the predetermined condition is satisfied, the unfinished part being a part corresponding to an unfinished step which is not determined to have been completed,
wherein the task is one of:
a first task for clearing a paper jam,
a second task for replacing consumables used for printing, and
a third task for adding paper to a tray.

16. A non-transitory recording medium for storing a computer readable program used in a computer, the computer readable program controlling the computer to execute processing comprising:
- determination processing for determining a completed step based on a change in state of a target on which a task is to be performed, the completed step being a step which has been completed; and
- reproduction processing for reproducing an unfinished part in a first form where a predetermined condition is not satisfied, and reproducing the unfinished part in a second form different from the first form where the predetermined condition is satisfied, the unfinished part being a part corresponding to an unfinished step which is not determined to have been completed, wherein the task is one of:
- a first task for clearing a paper jam,
- a second task for replacing consumables used for printing, and
- a third task for adding paper to a tray.

* * * * *